Patented Nov. 7, 1939

2,179,134

UNITED STATES PATENT OFFICE 2,179,134

INORGANIC LUMINOUS MATERIAL

Marcel Servigne, Paris, France, assignor to Societe pour l'Etude & l'Exploitation des Matieres Luminescentes, Paris, France No Drawing. Application December 1, 1936, Serial No. 113,725. In Great Britain November 18, 1936

12 Claims. (Cl. 250—81)

The present invention relates to luminescent materials that is to say, fluorescent or phosphorescent materials, comprising one or more inorganic materials. It is known that the luminescent materials employed industrially heretofore, for example for the television reception, radioscopy, and lighting, above all by electric discharge tubes, have the disadvantage of being more or less altered or destroyed by various physical agents, such as the excitation agents, electrons, luminous radiations, X-rays of heat, moisture, and so forth. For example, the sulphides of calcium, of zinc and/or cadmium alter even in the air under the influence of light and heat, and still more so if they are placed in electric discharge tubes.

The object of the present invention is to remedy this disadvantage by adding to the materials in question inorganic bodies in the crystallized state, of white color, the melting point of which is at least equal to that of the luminescent substances to which they are added. Of course these bodies should be inalterable in the conditions of use of these materials. Furthermore, at the thickness at which the luminescent material is employed, and which is in general of the order of $\frac{1}{10}$ of a millimetre, they must be transparent both to the excitation radiations and to the emitted radiations, so that the absorption of the light by the added body will be negligible.

Among the substances answering these conditions may be mentioned bodies, which are at least binary and which are stable at high temperatures at least equal to 1,000° C., such as silica, certain alkaline earth metal salts, e. g. calcium borate, and their mixtures, but it has been found, according to the present invention, that of all the bodies which may be employed, tricalcium orthophosphate is by far the most suitable.

These bodies may be added, ready manufactured beforehand, to the unstable luminescent substances, for instance in the form of a very fine powder.

The manner of adding the supplementary body to the initial unstable luminescent material should naturally be adapted to the properties of the latter, and particularly if it is to be feared, as in the case of sulphides, that subsequent heating will have a fatal effect, it will be sufficient to add the protective body by merely mixing, instead of operating as usual by calcination.

In every case, mixing will be effected as homogeneously as possible so as to distribute the stable body as uniformly as possible in the luminescent material in order to surround the grains of unstable luminescent material by the microcrystals of the body which may be called "stabilizing body". It will be appreciated that the alterable part of the unstable luminous material will thus be protected mechanically from the reducing actions which take place either during the preparation of the luminous materials or during the use of the final substance obtained, for example, during the formation and operation of the electric discharge tubes in which the said final luminous materials are employed. It is known for example that commercial calcium molybdate called "pure for analyses" browns and blackens immediately when, after it has been applied by means of a film of glycerin containing boric acid to the inner wall of the discharge tube, the tube is heated for removing the glycerin, or as soon as, for "forming" the tube, the first electric discharge is passed through the latter for purifying the electrodes. It is found that the lower oxide $Mo_2O_5$ or molybdenum blue of a rather dark color is formed. The reduction, which may proceed as far as the liberation of the metal, is due to the action of the nascent hydrogen and carbon monoxide which are liberated in considerable quantities during the first electric discharges for purifying the electrodes. By adding according to the present invention to this calcium molybdate before it is used in the tube a certain quantity of tricalcium orthophosphate, a material is obtained which does not exhibit the least alteration in the above-mentioned operations and the discharge tube can work for thousands of hours without a spot, while substantially retaining its initial luminous efficiency. Thus, a product has been made utilizable in discharge tubes which previously was not so.

The quantity of stabilizing body to be added to an unstable luminescent material for preventing the alteration thereof depends upon the nature of the later. It is obvious from the foregoing explanations that if the quantity of alterable compounds which it contains is small, the quantity of stabilizing body or bodies to be added will likewise be small.

From this point of view, according to the present invention, a quantity of stabilizing bodies at least equal to the quantity of the alterable body or bodies will be added. The nature of the latter body or bodies is readily deduced from the chemical properties of the bodies entering into the composition of the initial luminescent material. It may even be determined if necessary experimentally by some preliminary examinations of the various components in a discharge tube. For example, in the above-mentioned case of calcium molybdate employed alone, a quantity of stabilizing body, for example tricalcium phosphate, equal to the quantity of calcium molybdate is added.

The anti-reducing function, indicated in the foregoing, of the stabilizing body is exercised, but this time from the chemical point of view, in the case where a sufficiently stable initial luminescent material comprises in the known manner alkali-metal salts, such as small quantities of sodium chloride, intended for example to activate the emission of radiations. Such materials, however, are particularly alterable, because the reducing reactions which may take place during manufacture of the luminescent material or during the "formation" of the discharge tube are, as is known, catalyzed, by the presence of small quantities of alkali-metal salts. In this case, the addition of the stabilizing bodies must cause the latter to be considered as veritable poisons of the said catalysts. Consequently, the present invention makes it possible to add to the luminescent materials suitable alkali-metal salts in desired quantities for attaining the maximum luminous efficiency without any deterioration of the luminescent material.

By way of example it will be mentioned that calcium tungstate termed "chemically pure" and possessing a relatively satisfactory stability in discharge tubes, blackens rapidly in a discharge tube when mixed with 10% of sodium tungstate, likewise termed "chemically pure". The same mixture of tungstates, to which has been added 30% of tricalcium orthophosphate is completely stable.

Likewise, calcium tungstate mixed with 1% of sodium chloride rapidly blackens, but this does not occur if 1% of tricalcium orthophosphate is added to said mixture.

Although obviously, in order not to weaken the luminous efficiency, it is sufficient to add only the practically necessary quantity of stabilizing body for obtaining stabilization, it has been recognized according to the present invention that it is possible to add the stabilizing body in larger quantities than that above-mentioned, because it has been found that in this way the luminous efficiency of the final luminescent material remains much more constant during its life, although the initial efficiency is diminished by an excess of stabilizing body. By way of example, it will be mentioned that a substantially white light is obtained with the following composition which is absolutely stable in a mercury vapor discharge tube:

| | Parts |
|---|---|
| Diluent: | |
| $CaMoO_4$ | 20 |
| $PbMo_2O_8$ | 5 |
| Phosphorogen: | |
| $Li_2O$ | ¼ |
| Stabilizing addition: | |
| $Ca_3P_2O_8$ | 75 |

The addition of the stabilizing body may also be effected to the elements of the original luminescent material before or during the manufacture of the latter. It is also possible to start not from the stabilizing body itself, but from elements which will form this body in the course of the manufacture of the luminescent material. For example, if it is desired to manufacture stabilized calcium molybdate, there will be added to a solution of calcium chloride simultaneously a solution of molybdic acid or a soluble salt of said acid, and a solution of phosphoric acid. The tricalcium phosphate precipitates at the same time as the calcium molybdate. A subsequent treatment will, in the known manner, bring this material in the form in which it is to be used.

The fact that the stabilizing bodies according to the present invention have a very high melting point permits them to retain their function in the case where the final luminescent substances are incorporated against the glass wall of the tube by softening the latter. Indeed, the softening point of this tube glass, for example boro-silicate glass, is lower than that of the stabilizing body. The stabilizing body will have still retained its primitive crystalline structure and consequently will still play its mechanical part of the protective screen.

What I claim is:

1. A luminescent substance comprising calcium molybdate and crystals of tricalcium orthophosphate, these crystals being in sufficiently large quantity to render the luminescent substance stable in the conditions of its utilization.

2. A luminescent substance comprising calcium tungstate and crystals of tricalcium orthophosphate.

3. A luminescent substance comprising luminescent calcium tungstate, sodium chloride and crystals of tricalcium orthophosphate.

4. A luminescent substance comprising calcium molybdate, lead molybdate, a small quantity of lithium oxide and crystals of tricalcium orthophosphate, these crystals being in sufficiently large quantity to render the luminescent substance stable in the conditions of its utilization.

5. A process of manufacturing a luminescent substance which comprises simultaneously precipitating in admixture calcium molybdate and tricalcium orthophosphate from the same solution, the tricalcium orthophosphate being in sufficiently large quantity to render the luminescent mixture stable in the conditions of its utilization.

6. A luminescent substance consisting of a mixture of a substance luminescent per se and of crystals of a substance selected from the group consisting of tricalcium orthophosphate and calcium borate, this substance being in a sufficiently large quantity to render the luminescent substance stable in the conditions of its utilization.

7. A luminescent substance comprising calcium tungstate, sodium tungstate and crystals of tricalcium orthophosphate.

8. A luminescent substance consisting of approximately 100 parts of chemically pure calcium tungstate, 10 parts of chemically pure sodium tungstate and 30 parts of tricalcium orthophosphate.

9. A luminescent substance consisting of substantially equal quantities of calcium molybdate and crystals of tricalcium orthophosphate.

10. A luminescent substance consisting of a substance luminescent per se, an alkali-metal salt and crystals of a substance selected from the group comprising tricalcium orthophosphate and calcium borate, this substance being in a sufficiently large quantity to render the luminescent substance stable in the conditions of its utilization.

11. A luminescent substance consisting of approximately 100 parts of calcium tungstate, 1 part of sodium chloride and 1 part of tricalcium orthophosphate.

12. A luminescent substance consisting of approximately 20 parts of calcium molybdate, 5 parts of lead molybdate, one fourth of a part of lithium oxide and 75 parts of tricalcium orthophosphate.

MARCEL SERVIGNE.